Nov. 30, 1943. S. L. MILLHOUSE ET AL 2,335,297
TRAILER HITCH
Filed Dec. 5, 1942 2 Sheets-Sheet 2
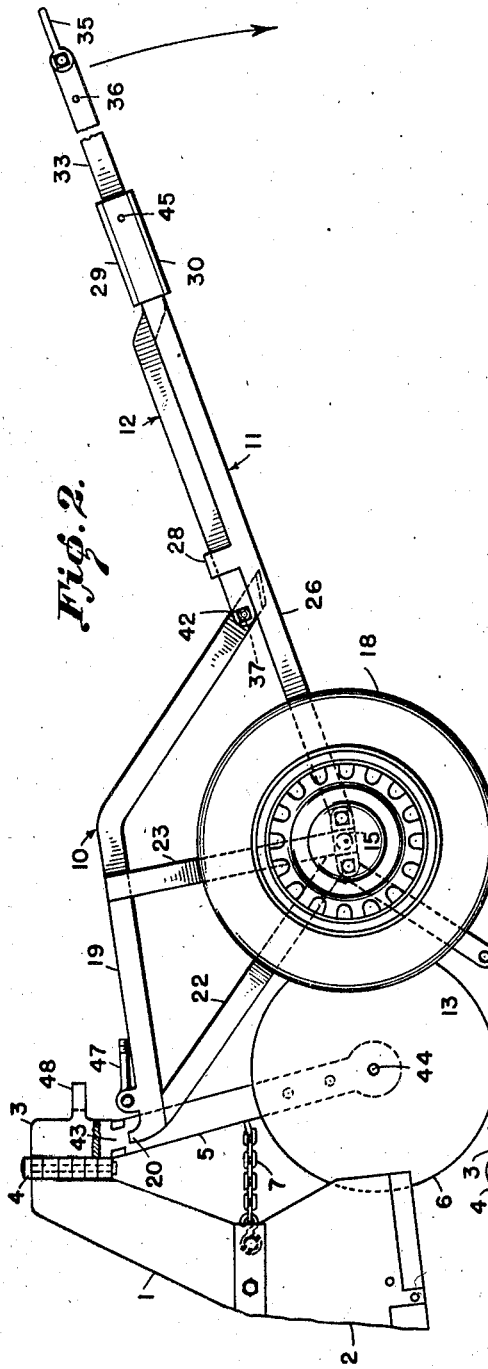
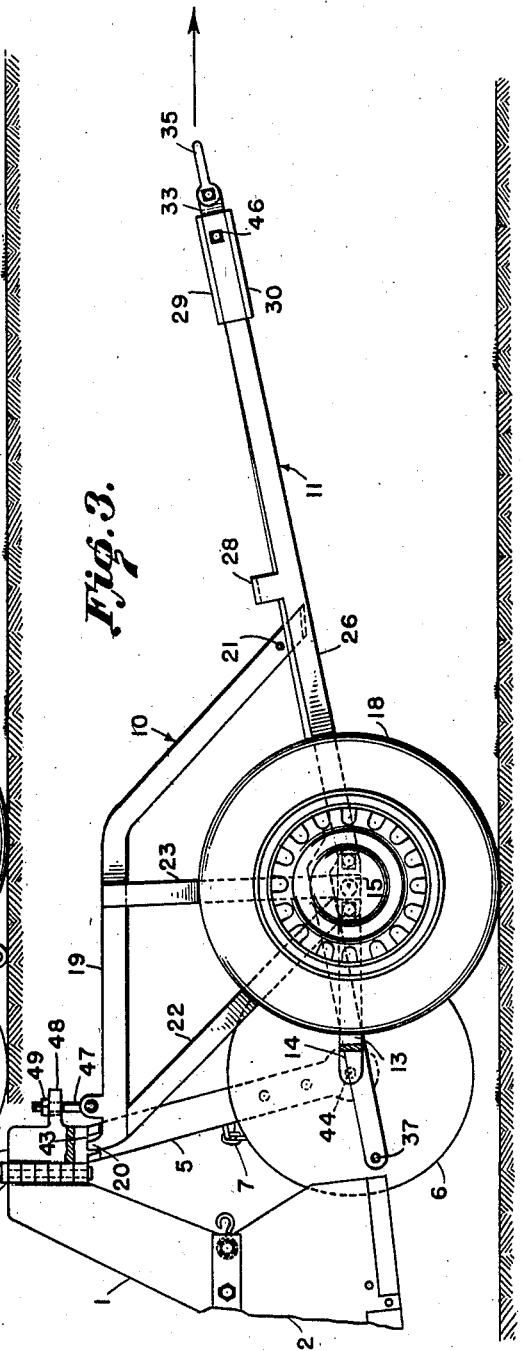
INVENTORS
E. W. SCHULTZ
S. L. MILLHOUSE
BY
ATTORNEYS Patented Nov. 30, 1943

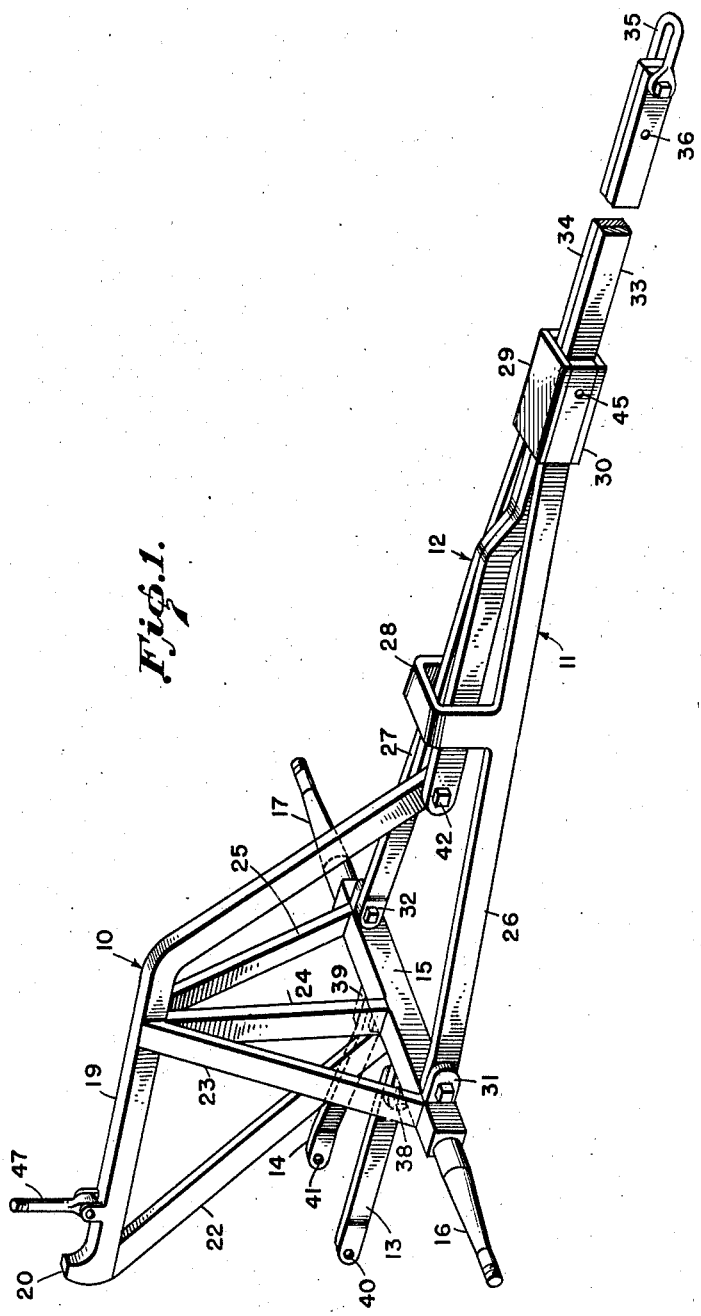

2,335,297

UNITED STATES PATENT OFFICE 2,335,297

TRAILER HITCH

Steve L. Millhouse and Earl W. Schultz,
Lincoln, Nebr.

Application December 5, 1942, Serial No. 467,938

12 Claims. (Cl. 280—46)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to a trailer hitch of the tandem type, and has among its objects the provision of a hitch of simple and easily constructed design; the provision of a hitch which can be easily coupled to the load; the provision of a hitch which elevates an end portion of a wheel-carried machine to be transported, whereby the wheels of the end portion are lifted from the ground to remove the weight of that end portion of the machine; and other objects which will be apparent from the following description of the invention and of the claims.

An embodiment of the invention is illustrated in the accompanying drawings, in which—

Figure 1 is a three-dimensional view of the hitch with its wheels removed to clearly show the parts.

Figure 2 is a side elevation showing the position of the hitch immediately prior to coupling it to the load; and Figure 3 is an elevation of the hitch showing it coupled to the load ready for attachment to a tractor or other pulling means.

The hitch is designed particularly for transporting tree-planting machines, although it may be used for transporting other types of devices. The tree-planting machine with which the hitch is used is of known type, and is fragmentarily illustrated in Figures 2 and 3, which show only a sufficient part of the rear end of the planting machine to illustrate the manner of coupling it to a hitch.

The planting machine is provided with a frame part 1, to which seedling chute fins 2 are attached. A yoke or forked frame 3 is pivoted to the frame part by a hinge joint 4. The yoke has two arms one of which is shown at 5, the other arm being broken away for clearness in illustration. The lower end of each arm carries a work-wheel, one of which is shown at 6. A stay-chain 7 couples arm 5 to the frame part to relieve the joint 4 of pulling strains when the machine is used.

In use, the planting machine is pulled through a field in the left-hand direction shown in Figure 2, with the chute following a lister shear (not shown), and tree seedlings are fed through the chute. The work-wheels follow behind and pack the dirt about the roots of the seedlings.

If the machine is to be transported, the lister shear and chute are raised from the soil. This places the weight of the rear part of the machine on the work-wheels which are not designed and cannot be used to carry the load any appreciable distance. The front wheels (not shown) of the machine are load-carrying wheels, and may be used in transportation. The trailer hitch of this invention provides for elevating the rear end of the planting machine and carrying the weight of its rear portion. The machine is transported in a direction opposite to its direction of motion when in use.

Details of the trailer hitch construction are best illustrated in Figure 1. It comprises, in general, a rigid frame 10, a tongue 11, a telescoping lever 12, and a pair of rigid holding arms 13 and 14.

Frame 10 is provided with an axle 15 having spindles 16, 17, on which load-bearing wheels, one of which is shown at 18 in Figures 2 and 3, are mounted in a conventional manner. A bar 19 carries an upwardly extending hook 20 at its rear end for engaging the rear end of the planting machine to support it, and is provided with an aperture 21 at its forward end. The bar is rigidly attached to the axle by braces 22, 23, 24 and 25.

The tongue 11 comprises side arms 26 and 27 secured together at an intermediate point by an integral piece 28, and at the forward end by spaced apart plates 29 and 30 welded thereto. It is pivotally mounted on the axle by the bolt and lug means shown at 31 and 32. The piece 28 is raised above arms 26 and 27, and the telescoping lever 12 slides immediately under it between the arms and through the space provided between the plates, thus fixing the lever against other than the telescoping movement. The telescoping lever is formed by two straps 33 and 34 provided at their front end with a clevis 35, and an aperture 36 near the clevis and an aperture 37 near their rear ends.

The holding arms 13 and 14 which are of predetermined length, are pivotally mounted on the rear of the axle by bolt and lug means shown at 38 and 39, respectively, and are provided with apertures 40 and 41 at their free ends.

To use the trailer hitch, assume that the tree-planting lister has been raised from the soil, resting the weight of the rear portion of the machine on the work-wheels, as shown in Figure 2. Lever 12 is extended forward until aperture 37 coincides with aperture 21, and a bolt or pin 42 is inserted through the apertures. This rigidly affixes the tongue 11 to the frame 10, with the lever in position to give an increased leverage when force is applied downward on its free end. The trailer hitch is then backed up to the planting machine and hook 20 is dropped by raising the free end of the lever until the hook may be moved under the bight of the yoke 3. In this position the free end of the lever is forced downward, moving hook 20 into a retaining socket 43 provided in yoke 3 for this purpose. Further downward movement of the end of the lever raises the rear end of the planting machine, the wheels of the hitch acting as a fulcrum. At the same time, the trailer hitch wheels and the planting machine are moved toward each other, and when in proper position stud bolts are inserted through apertures 40 and 41 of the holding arms 13 and 14, and are threaded into suitable apertures, one of which is shown at 44, provided in the work-wheels at their centers. This fixes the rear end of the planting machine in its raised position, and the free end of the lever can be released.

The pin 42 is then removed and the telescoping lever is shoved back, the straps 33 and 34 riding over the axle and straddling braces 22 and 24 until the aperture 36 alines with an aperture 45 in the forward end of the tongue. A pin 46 is inserted through alined apertures 45 and 36, and a tractor or other power-furnishing means may be coupled to the clevis 35.

The stay chains are next unhooked, allowing feedom of rotary motion of yoke 3 on the hinge 4 to provide the king pin turning movement of the hitch.

A safety means is provided to prevent the rear end of the planting machine from being accidentally jolted and the hook 20 displaced from the retaining socket 43. This means comprises a lock bolt 47 secured to bar 19, which is swung into position between lugs 48 provided on the yoke 3, and provided with a nut 49 which when tightened securely locks hook 20 in retaining socket 43.

The ease of coupling a hitch to a machine and the ease with which its weight is elevated are manifest. Two persons can easily make the coupling, one to handle the telescoping lever bearing down on its free end to elevate the machine, and the other to fasten the stud bolts through apertures 40 and 41 of the holding arms.

The above detailed description is not intended as limiting the invention, except as may be required by the following claims.

What is claimed is:

1. A tandem trailer hitch for transporting a load having one of its ends carried by load-carrying wheels, said hitch comprising load-bearing wheels, a frame carried by the wheels, a tongue pivotally mounted in respect to the frame, means for detachably rigidly affixing the tongue relative to the frame, the parts being so constructed and arranged that a portion of the frame may be placed under the other end of the load and the tongue, when rigidly affixed to the frame, used as a lever and the wheels as a fulcrum to elevate the said other end, and means for fixing the said other end in its elevated position when the means for rigidly affixing the tongue relative to the frame is detached.

2. A tandem trailer hitch for transporting a load having one of its ends carried by load-carrying wheels, said hitch comprising load-bearing wheels, a frame carried by the wheels, a tongue pivotally mounted in respect to the frame, means for detachably rigidly affixing the tongue relative to the frame, the parts being so constructed and arranged that a portion of the frame may be placed under the other end of the load and the tongue, when rigidly affixed to the frame, used as a lever and the wheels as a fulcrum to elevate the said other end, and a rigid holding arm for attaching the frame to the said other end to fix it in elevated position when the means for rigidly affixing the tongue relative to the frame is detached.

3. A trailer hitch comprising load-bearing wheels, a frame carried by the wheels, a tongue pivotally mounted in respect to the frame, and means rigidly affixing the tongue relative to the frame, whereby a portion of the frame may be placed under a load and the tongue used as a lever and the wheels as a fulcrum to elevate the load, said means comprising a strap mounted on the tongue and movable relative thereto to increase the leverage of the tongue, and a detachable connection for affixing one end of the strap relative to the frame when the strap is in the increased leverage position.

4. A tandem trailer hitch for transporting a load having one of its ends carried by load-carrying wheels, said hitch comprising load-bearing wheels, a frame carried by the wheels, a tongue pivotally mounted in respect to the frame, means for rigidly affixing the tongue relative to the frame comprising a strap mounted on the tongue and movable relative thereto to increase the effective leverage of the tongue and a detachable connection for affixing one end of the strap relative to the frame when the strap is in the increased leverage position, whereby a portion of the frame may be placed under the other end of the load and the tongue, when rigidly affixed to the frame, used as a lever and the wheels as a fulcrum to elevate the said other end, and means for fixing the said other end in its elevated position when the means for rigidly affixing the tongue relative to the frame is detached.

5. A tandem trailer hitch for transporting a load having one of its ends carried by load-carrying wheels, said hitch comprising load-bearing wheels, a frame carried by the wheels, a tongue pivotally mounted in respect to the frame, means for rigidly affixing the tongue relative to the frame comprising a strap mounted on the tongue and movable relative thereto to increase the effective leverage of the tongue and a detachable connection for affixing one end of the strap relative to the frame when the strap is in the increased leverage position, whereby a portion of the frame may be placed under the other end of the load and the tongue, when rigidly affixed to the frame, used as a lever and the wheels as a fulcrum to elevate the said other end, and a rigid holding arm for attaching the frame to the said other end to fix it in elevated position when the means for rigidly fixing the tongue relative to the frame is detached.

6. A trailer hitch comprising a rigid frame provided with an axle having load-bearing wheels mounted thereon, and with a rigid bar extending over the axle forwardly and rearwardly thereof, the bar being rigidly attached to the axle and provided on its rear end with an upturned hook to engage a retaining socket in a load to be transported, a tongue pivotally mounted on the axle, and means for detachably attaching the forward end of the bar to the tongue to fix the tongue relative to the axle, whereby when so fixed it may be used as a lever to elevate the load with the wheels acting as a fulcrum and the hook engaged in the retaining socket.

7. A tandem trailer hitch for transporting a load having one of its ends carried by load-carrying wheels, said hitch comprising a rigid frame provided with an axle having load-bearing wheels mounted thereon and with a bar extending over the axle forwardly and rearwardly thereof, the bar being rigidly attached to the axle and provided on its rear end with means for engaging and supporting the other end of the load, a tongue pivotally mounted on the axle, means for detachably attaching the forward end of the bar to the tongue to fix the tongue relative to the axle, whereby the tongue when so fixed may be used as a lever to elevate the other end of the load with the wheels acting as a fulcrum, and means for rigidly connecting the axle to the load when it is in elevated position so constructed and arranged that the forward end of the bar may be detached from the tongue and the load-carrying and load-bearing wheels will support the load.

8. The subject-matter of claim 7 characterized in that the tongue carries a telescoping lever which may be extended to increase the leverage of the tongue but which is fixed substantially against other than telescopic movement relative to the tongue and in that the forward end of the bar is detachably connected to the lever when it is in its extended position.

9. The subject-matter of claim 7 characterized in that the tongue carries a telescoping lever which may be extended to increase the leverage of the tongue and which when retracted rides over the axle.

10. The subject-matter of claim 7 characterized in that the tongue carries a telescoping lever which may be extended to increase the leverage of the tongue, in that means are provided to lock the lever to the tongue in retracted position, and in that the forward end of the lever is provided with means for attachment to a pulling means.

11. The subject-matter of claim 7 characterized in that the tongue carries a telescoping lever which may be extended to increase the leverage of the tongue but which is fixed substantially against other than telescoping movement relative to the tongue, in that the forward end of the bar is detachably connected to the lever when it is in its extended position, and in that means are provided to lock the lever near its forward end to the forward end of the tongue when the lever is in its retracted position with the rear end of the lever detached from the bar and riding over the axle.

12. The combination with a machine, provided at its one end with load-carrying wheels and at its other end with work-wheels not capable of carrying the load when the machine is being transported, of a tandem trailer hitch comprising wheels, a rigid frame carried by the wheels, a tongue pivotally mounted in respect to the frame, means for detachably rigidly affixing the tongue relative to the frame, the parts being so constructed and arranged that a portion of the frame is insertable under the said other end and the tongue is usable as a lever with the trailer hitch wheels acting as a fulcrum for elevating the said other end to place its weight on the trailer hitch wheels, and means for fixing the said other end in its elevated position when the means for rigidly affixing the tongue relative to the frame is detached.

STEVE L. MILLHOUSE.
EARL W. SCHULTZ.